(12) United States Patent
Bryan et al.

(10) Patent No.: US 8,924,345 B2
(45) Date of Patent: Dec. 30, 2014

(54) CLUSTERING AND SYNCHRONIZING CONTENT

(75) Inventors: Nicholas James Bryan, Stanford, CA (US); Paris Smaragdis, Urbana, IL (US); Gautham J. Mysore, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 111 days.

(21) Appl. No.: 13/335,701

(22) Filed: Dec. 22, 2011

(65) Prior Publication Data

US 2013/0124462 A1 May 16, 2013

Related U.S. Application Data

(60) Provisional application No. 61/539,463, filed on Sep. 26, 2011.

(51) Int. Cl.
*G06F 17/30* (2006.01)

(52) U.S. Cl.
CPC .... *G06F 17/30743* (2013.01); *G06F 17/30017* (2013.01)
USPC ............ 707/610; 707/737; 707/748; 707/759

(58) Field of Classification Search
CPC .................... G06F 17/30743; G06F 17/30017
USPC ......... 707/610, 602, 661, 705, 722, 737, 741, 707/749, 759, 802, 805, 811
See application file for complete search history.

(56) References Cited

U.S. PATENT DOCUMENTS

| | | | |
|---|---|---|---|
| 5,918,223 A * | 6/1999 | Blum et al. ............ | 707/999.001 |
| 6,480,902 B1 | 11/2002 | Yuang et al. | |
| 6,512,884 B1 | 1/2003 | Sawada | |
| 6,744,815 B1 | 6/2004 | Sackstein et al. | |
| 7,031,980 B2 * | 4/2006 | Logan et al. ............ | 707/999.01 |
| 7,057,663 B1 | 6/2006 | Lee | |
| 7,301,092 B1 | 11/2007 | McNally et al. | |
| 7,371,958 B2 * | 5/2008 | Kim et al. ........................ | 84/609 |
| 7,756,874 B2 * | 7/2010 | Hoekman et al. ............ | 707/737 |
| 8,053,659 B2 * | 11/2011 | Alcalde et al. ................. | 84/608 |
| 8,082,279 B2 * | 12/2011 | Weare ........................... | 707/804 |
| 8,213,521 B2 * | 7/2012 | Deng ......................... | 375/240.26 |
| 8,290,918 B1 * | 10/2012 | Ioffe ............................ | 707/698 |
| 8,407,230 B2 * | 3/2013 | Slaney et al. ................. | 707/748 |
| 8,463,719 B2 * | 6/2013 | Lyon et al. ..................... | 706/12 |
| 8,533,134 B1 * | 9/2013 | Zhao et al. ..................... | 706/12 |

(Continued)

OTHER PUBLICATIONS

Avery Li-Chun Wang; "An Industrial-Strength Audio Search Algorithm"; Proceedings of ISMIR 2003, 4th International Conference on Music Information Retrieval; Baltimore, Maryland, USA; Oct. 27-30, 2003; 7 pages.

Cotton, C.V.; Ellis, D.P.W.; "Audio fingerprinting to identify multiple videos of an event"; 2010 IEEE International Conference on Acoustics Speech and Signal Processing (ICASSP); Mar. 14-19, 2010; pp. 2386-2389.

(Continued)

*Primary Examiner* — Jay Morrison
*Assistant Examiner* — Dangelino Gortayo
(74) *Attorney, Agent, or Firm* — Wolfe-SBMC

(57) ABSTRACT

Clustering and synchronizing content may include extracting audio features for each of a plurality of files that include audio content. The plurality of files may be clustered into one or more clusters. Clustering may include clustering based on a histogram that may be generated for each file pair of the plurality of files. Within each of the clusters, the files of the cluster may be time aligned.

20 Claims, 12 Drawing Sheets

(56) References Cited

U.S. PATENT DOCUMENTS

| | | | |
|---|---|---|---|
| 8,549,022 B1 * | 10/2013 | Kaminski, Jr. | 707/758 |
| 2003/0023421 A1 * | 1/2003 | Finn et al. | 704/1 |
| 2005/0060753 A1 | 3/2005 | Lundblad et al. | |
| 2005/0238059 A1 | 10/2005 | Lundblad et al. | |
| 2005/0281246 A1 | 12/2005 | Seo et al. | |
| 2005/0281437 A1 | 12/2005 | Fruchter et al. | |
| 2006/0002681 A1 | 1/2006 | Spilo et al. | |
| 2006/0017846 A1 | 1/2006 | Kim | |
| 2006/0078305 A1 | 4/2006 | Arora et al. | |
| 2008/0263620 A1 | 10/2008 | Berkvens et al. | |
| 2010/0257069 A1 | 10/2010 | Levy et al. | |
| 2010/0332485 A1 * | 12/2010 | Lahti et al. | 707/758 |
| 2011/0261257 A1 | 10/2011 | Terry et al. | |
| 2011/0276157 A1 * | 11/2011 | Wang et al. | 700/94 |

OTHER PUBLICATIONS

Lyndon Kennedy and Mor Naaman; "Less talk, more rock: automated organization of community-contributed collections of concert videos"; Proceedings of the 18th International Conference on World Wide Web; 2009; Madrid, Spain; 10 pages.

Prarthana Shrestha, Mauro Barbieri, Hans Weda; "Synchronization of Multi-Camera Video Recordings Based on Audio"; Proceedings of the 15th international conference on Multimedia; 2007; 4 pages.

Jaap Haitsma and Ton Kalker; "A Highly Robust Audio Fingerprinting System"; ISMIR—The International Society for Music Information Retrieval; 2002 proceedings; Paris, France; 9 pages.

* cited by examiner

|  | File 1 | File 2 | File 3 | File 4 | File 5 |
|---|---|---|---|---|---|
| File 1 |  | 0 | 1 | 0.2 | 0 |
| File 2 |  |  | 1 | 0 | 0 |
| File 3 |  |  |  | 0 | 0 |
| File 4 |  |  |  |  | 1 |
| File 5 |  |  |  |  |  |

FIG. 11

|  | File 1 | File 2 | File 3 | File 4 | File 5 |
|---|---|---|---|---|---|
| File 1 |  |  | 1 |  |  |
| File 2 |  |  | 1 |  |  |
| File 3 |  |  |  |  |  |
| File 4 |  |  |  |  | 1 |
| File 5 |  |  |  |  |  |

FIG. 12

CLUSTERING AND SYNCHRONIZING CONTENT

PRIORITY INFORMATION

This application claims benefit of priority of U.S. Provisional Application Ser. No. 61/539,463 entitled "Clustering and Synchronizing Content" filed Sep. 26, 2011, the content of which is incorporated by reference herein in its entirety.

BACKGROUND

Through the mass proliferation of smartphones and low-cost portable electronics, video and audio recording devices have become ubiquitous. As a result, tens, hundreds, or even thousands of people can simultaneously record a single moment in history, creating large collections of unorganized audio and video recordings. Moreover, in shooting a movie, a film crew may end up with thousands of video and audio recordings at the end of the film shoot. It is difficult, however, given such an audio-video collection, to accurately and efficient group multiple recordings of the same event and synchronize the files within each group.

SUMMARY

This disclosure describes techniques and structures for clustering and synchronizing content. In one embodiment, audio features may be extracted for each file of a plurality of files that include audio content. The plurality of files may be clustered into one or more clusters. Clustering may include clustering based on a histogram that may be generated for each file pair of the plurality of files. In one embodiment, the generated histogram may include one or more synchronization estimates. Each synchronization estimate may be a difference between offset estimates corresponding to a commonly occurring extracted audio feature in each of the respective files of the file pair. Within each of the clusters, the files of the cluster may be time aligned.

In one non-limiting embodiment, a synchronization offset may be determined based on the generated histograms. A similarity value may then be determined based on the strength of the synchronization offset. Clusters may include files having a similarity value above a threshold. In some instances, clusters may include files that are non-overlapping in time. In various embodiments, the clustering and synchronization may be refined.

BRIEF DESCRIPTION OF THE DRAWINGS

FIG. 11-12 illustrate example similarity matrices according to some embodiments.

Figure 1:
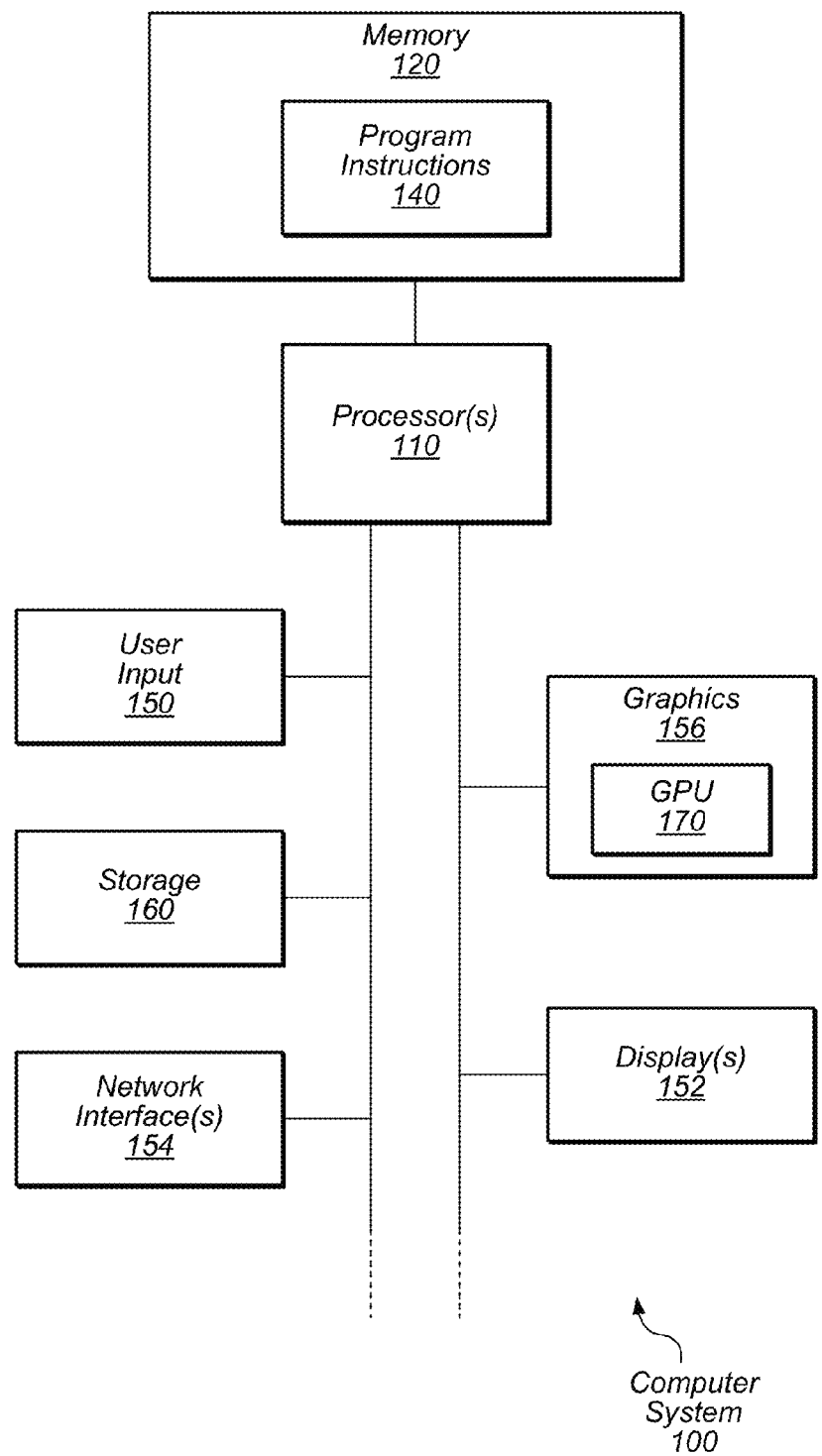
FIG. 1 is a block diagram of an illustrative computer system or device configured to implement some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. The headings used herein are for organizational purposes only and are not meant to be used to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

"First," "Second," etc. As used herein, these terms are used as labels for nouns that they precede, and do not imply any type of ordering (e.g., spatial, temporal, logical, etc.). For example, for a clustering and synchronization module clustering and synchronizing a plurality of content files, the terms "first" and "second" files can be used to refer to any two of the plurality of files. In other words, the "first" and "second" files are not limited to logical files 0 and 1.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Signal." Throughout the specification, the term "signal" may refer to a physical signal (e.g., an acoustic signal) and/or to a representation of a physical signal (e.g., an electromagnetic signal representing an acoustic signal). In some embodiments, a signal may be recorded in any suitable medium and in any suitable format. For example, a physical signal may be digitized, recorded, and stored in computer memory. The recorded signal may be compressed with commonly used compression algorithms. Typical formats for music or audio files may include WAV, OGG, RIFF, RAW, AU, AAC, MP4, MP3, WMA, RA, etc.

"Source." The term "source" refers to any entity (or type of entity) that may be appropriately modeled as such. For example, a source may be an entity that produces, interacts with, or is otherwise capable of producing or interacting with a signal. In acoustics, for example, a source may be a musical instrument, a person's vocal cords, a machine, etc. In some cases, each source—e.g., a guitar—may be modeled as a plurality of individual sources—e.g., each string of the guitar may be a source. In other cases, entities that are not otherwise capable of producing a signal but instead reflect, refract, or otherwise interact with a signal may be modeled a source—e.g., a wall or enclosure. Moreover, in some cases two different entities of the same type—e.g., two different pianos—may be considered to be the same "source" for modeling purposes.

Introduction

This specification first presents an illustrative computer system or device, as well as an illustrative clustering and synchronization module that may implement certain embodiments of methods disclosed herein. The specification then discloses techniques for clustering and synchronizing a plurality of content files. Various examples and applications are also disclosed. Some of these techniques may be implemented, for example, by a clustering and synchronization module or computer system.

In some embodiments, these techniques may be used in video and/or audio recording and processing, time-difference-of-arrival ("TDOA") or other synchronization estimation, audio/video organization, and many other applications. As one non-limiting example, the techniques may allow for content files to be clustered and synchronized. Although certain embodiments and applications discussed herein are in the field of audio, it should be noted that the same or similar principles may also be applied in other fields.

Example System

FIG. 1 is a block diagram showing elements of an illustrative computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In some embodiments, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In an embodiment, one or more display devices 152 may be coupled to the graphics component 156 for display of data provided by the graphics component 156.

In some embodiments, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Clustering and Synchronization Module

Figure 2:
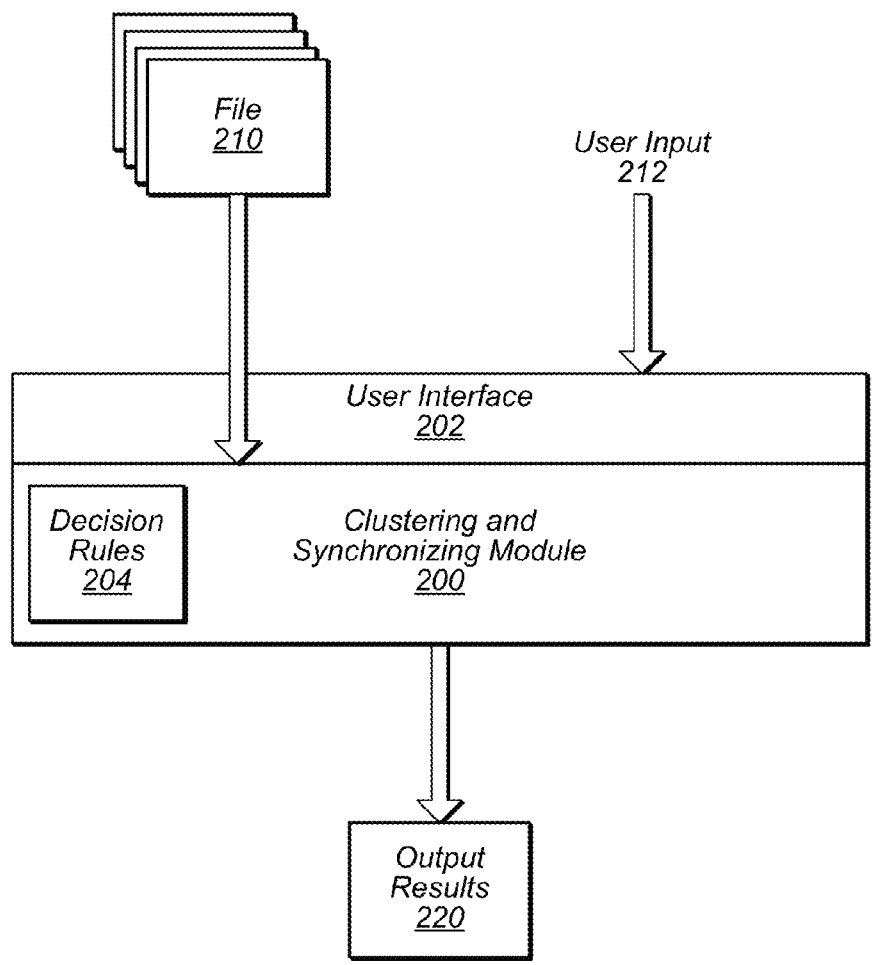
FIG. 2 is a block diagram of an illustrative clustering and synchronizing module according to some embodiments.

In some embodiments, a clustering and synchronization module may be implemented by processor-executable instructions (e.g., instructions 140) stored on a medium such as memory 120 and/or storage device 160. FIG. 2 shows an illustrative clustering and synchronization module that may implement certain embodiments disclosed herein. In some embodiments, module 200 may provide a user interface 202 that includes one or more user interface elements via which a user may initiate, interact with, direct, and/or control the method performed by module 200. Module 200 may be operable to obtain signal data (e.g., digital, analog, etc.) for the plurality of files 210, receive user input 212, analyze the signal data and/or the input, and output results 220. In an embodiment, the module may include or have access to additional or auxiliary information, such as decision rules 204. Decision rules 204 may be pre-determined and/or may be modified in response to user input 212, in some embodiments. Decision rules 204 may define whether a pair of files should be clustered. Output results 220 may include one or more clusters that group files of a distinct event together. Output results 220 may also include time offsets between each file within a cluster so that the files may be synchronized, which may also be referred to as time aligned.

Clustering and synchronizing module 200 may be implemented as or in a stand-alone application or as a module of or plug-in for a signal processing application. Examples of types of applications in which embodiments of module 200 may be implemented may include, but are not limited to, signal analysis, video and/or audio recording and processing, time-difference-of-arrival ("TDOA") or other synchronization estimation, audio/video organization, and or other applications in which clustering and synchronizing may be useful. Module 200 may also be used to display, manipulate, modify, classify, and/or store signals, for example to a memory medium such as a storage device or storage medium.

Figure 3:
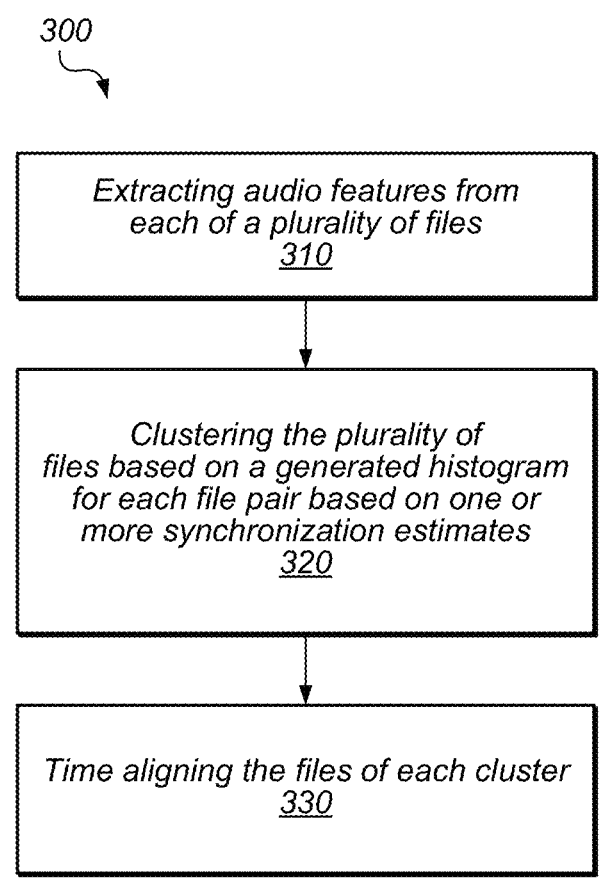
FIG. 3 is a flowchart of a method for clustering and synchronizing content according to some embodiments.

Turning now to FIG. 3, one embodiment of clustering and synchronizing video content is illustrated. While the blocks are shown in a particular order for ease of understanding, other orders may be used. In some embodiments, method 300 of FIG. 3 may include additional (or fewer) blocks than shown. Blocks 310-330 may be performed automatically, may receive user input, or may use a combination thereof. In some embodiments, one or more of blocks 310-330 may be performed by clustering and synchronization module 200 of FIG. 2.

As illustrated at 310, audio features that correspond to audio content may be extracted. In one embodiment, such audio features (e.g., audio fingerprints, landmarks, etc.) may be extracted for each of a plurality of content files that include audio content. Content files may include video files that include audio content, audio files, or other types of files that include some audio content. As one example, the plurality of content files may include video files of the same event, such as videos of a sporting event, concert, wedding, etc. taken from various perspectives. Such video files may be generated by devices of various users at the sporting event, concert, graduation, or wedding, for example. The devices could be cameras, video cameras, handheld devices, or mobile devices, such as cellular phones, tablet devices, or other mobile devices capable of recording video. In one embodiment, the plurality of content files may include audio files that do not contain video content. For example, in any of the above scenarios (e.g., sporting event, concert, graduation, wedding, etc.), audio may be recorded without video. Any of the above devices or any sound recording device (e.g., dedicated microphone) may be generate the content file having audio but not video. Thus, at 310, in an example scenario in which 180 content files have at least some audio content (e.g., 98 having audio but no video and 82 having video and audio), audio features may be extracted for each of the 180 content files.

In one example, feature extraction may include locating audio features within each of the plurality of content files. Audio features may include robust features such as landmarks. Audio landmarks may be represented in the format (f1, f2, Δt) where f1 and f2 are paired local frequency peaks, and Δt is a time offset from f1 to f2. In one embodiment, local maxima may be computed on an audio spectrogram for each of the plurality of content files. Peak pairs may be formed resulting in the landmark triple (f1, f2, Δt). The landmark triples may be unique within each file and robust to noise. The computation may be linear in file length and may be parallelized.

Figure 4A:
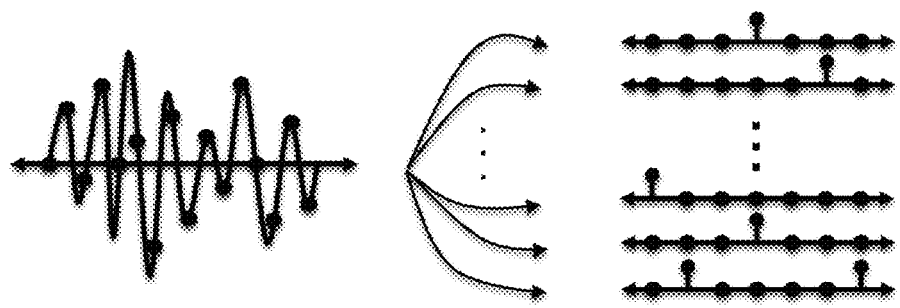
FIG. 4A illustrates an example conversion of an audio signal to a landmark signal according to some embodiments.
Figure 4B:
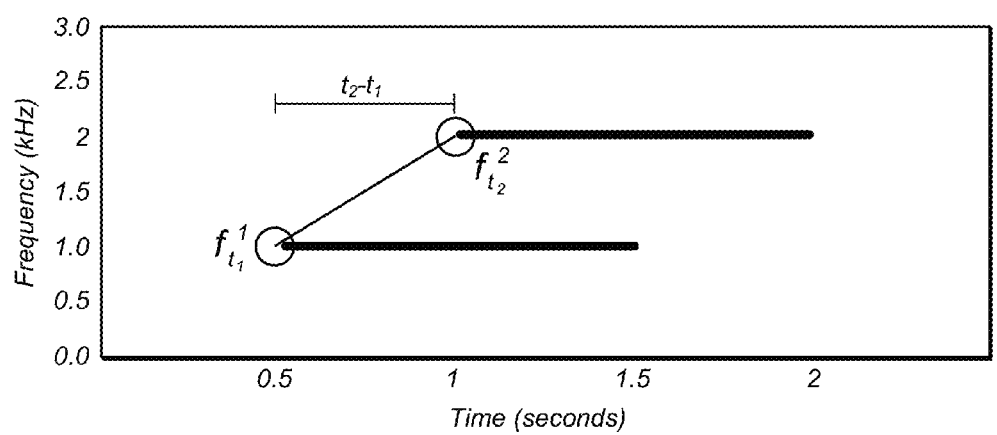
FIG. 4B illustrates an example landmark signal, according to some embodiments.

In one embodiment, the feature extraction of block 310 may include a non-linear transform of the audio signal. The landmark feature extraction may convert each audio signal $x(t) \in \Re$ into a sparse high-dimensional binary discrete-time signal denoted by the landmark signal L(t) as illustrated in FIG. 4A. In one embodiment, the transform may begin with a computation of the magnitude of the short-time Fourier transform (STFT) for each audio signal. The time axis may be downsampled as a function of the STFT hop size. The onsets of local frequency peaks may then be computed from the STFT, which may result in time-indexed frequency values $f_{t_j}{}^i$ where $i=1, 2, \ldots, N$; $j=1, 2, \ldots, M$ with N and M being the number of frequency values and time indices, respectively. The time-indexed frequency values may then be paired with neighboring values within a limited time-frequency region to create a set of time-indexed landmarks. Each set of time-indexed landmarks may consist of two frequencies and the time difference between. As an example, in a scenario in which $f_{t_j}{}^1$ and $f_{t_j}{}^2$ are paired, $(f_{t_j}{}^1, f_{t_j}{}^2, t_1-t_2)_{t1}$ may be produced. The subscript $t_1$ may denote the start time of the landmark. The combinatorial pairing of the landmarks may increase the discriminating power of the landmark representation and may enhance the clustering and synchronization. An example spectrogram with a single landmark overlaid is shown in FIG. 4B.

In one embodiment, each landmark may be hashed (e.g., quantized and packed) into a B-bit length integer value h, converting the landmarks to discrete time-indexed features analogous to words of a text document. The landmark hashes h and time indices t may then be used to create the binary $N=2^B$-dimensional landmark signal $L(t) \in \{0,1\}^N$ by setting L(t,h)=1, with L initialized to all zeros. In some instances, B may range from twenty to thirty, creating a million or more possible landmarks.

Figure 5:
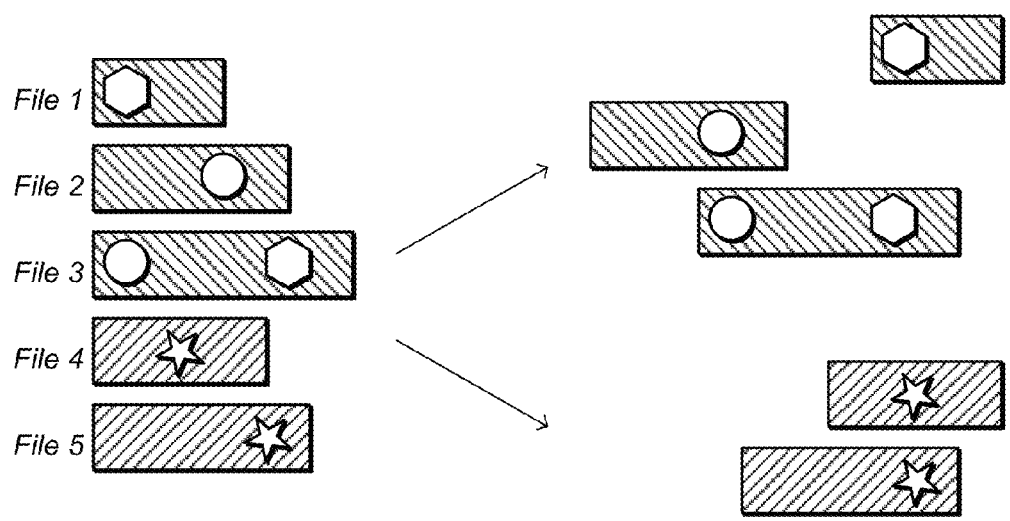
FIGS. 5-6 illustrate an example clustering and synchronizing of files according to some embodiments.

As shown at 320, the plurality of files may be clustered into one or more clusters. Clustering may include clustering the files into one or more clusters based on respective audio features that were extracted at 310. The clustering at 320 may result in one or more clusters that each contain one or more of the plurality of content files. For example, FIG. 5 illustrates an example in which the plurality of content files includes five unorganized files (e.g., video clips): File 1, File 2, File 3, File 4, and File 5. Note that each of Files 1 and 2 include a common audio feature, or landmark, with File 3. For ease of illustration and explanation, the audio features are shown in FIG. 5 as shapes. As described herein, even though Files 1 and 2 do not themselves share a common audio feature, they may nevertheless be clustered together because of their common link with File 3. Accordingly, Files 1, 2, and 3 may be clustered together and time synchronized in such an example. Further note that Files 4 and 5 share a common audio feature. As a result, Files 4 and 5 may be clustered and time synchronized together.

Figure 6:
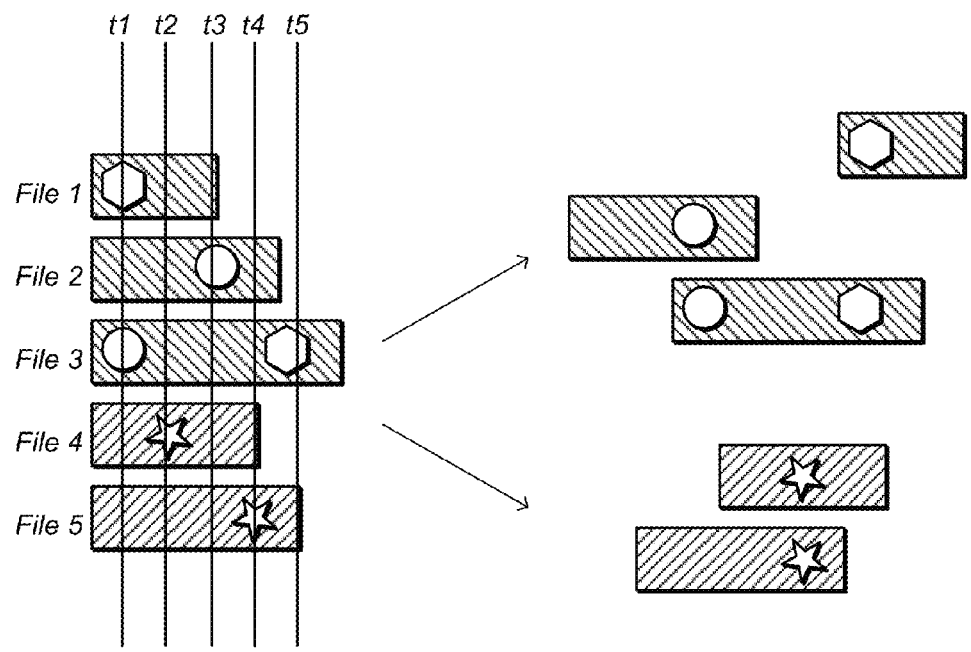

In some embodiments, clustering may include generating a similarity data structure (e.g., matrix) based on a map of the landmarks. An example map structure of landmarks may be seen in FIG. 7 for a file collection shown in FIG. 6. As illustrated, the map data structure includes key-value pairs. The key shown in FIG. 7 may be the audio landmark triples (f1, f2, Δt) and represent a unique landmark while the value may be a set of tuples consisting of (fileID, T) tuples. The values may represent instances of those landmarks within a content file. For example, the top row illustrates a landmark designated with a hexagon. That particular landmark may be present in file fl1 at a time t1 and in file 3 at a time of t3. Moreover, the second row shows a landmark designated with a circle. The landmark corresponding to the key circle may be present in file fl2 at time t3 and in file fl3 at time t1. As illustrated, matching files may include common landmarks/keys. The time portion of each value may not represent an actual time. For instance, it may be an absolute time offset such that fl1,t1 may represent that the landmark occurs in file fl1 at an offset time t1 from some reference time. The difference between time offsets of matching landmarks may then be the overall time offset or synchronization point between the files.

Figure 8:
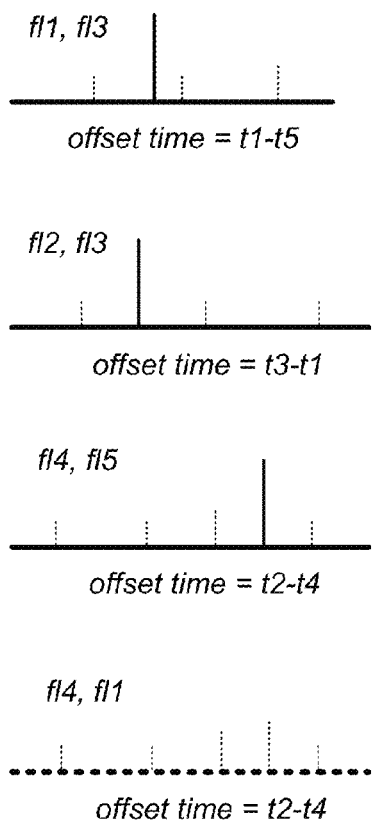
FIGS. 8-9 illustrate example histograms indicating candidate synchronization offsets according to some embodiments.
Figure 9:
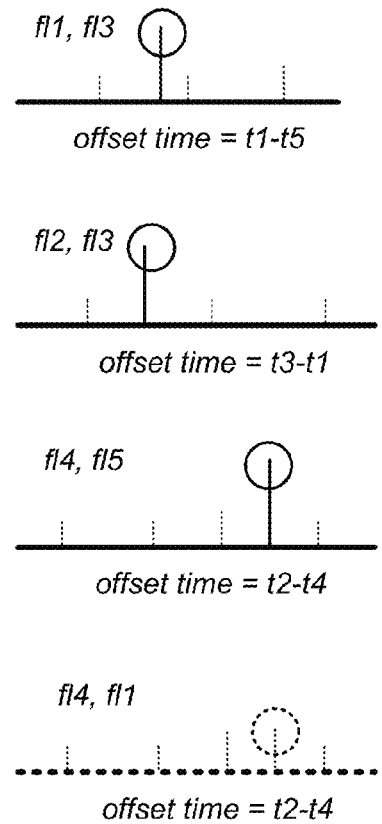

In one embodiment, generating a similarity matrix may include generating a plurality of histograms (e.g., by the landmark signal cross-correlation described herein or other techniques) based on the map structure. For instance, a histogram may be generated for each file pair. In one embodiment, generating a histogram may include for each unique audio feature present in the data structure having more than one unique file associated with it, creating synchronization estimates between every unique pair of file IDs. Creating the synchronization estimates may be performed by subtracting the associated offset times or by performing an estimate of a time offset (e.g., TDOA), as described herein. The resulting synchronization estimates may be stored in a histogram. Continuing the example from above that includes five files, a histogram may be generated between files fl1 and fl2, between fl1 and fl3, fl1 and fl4, fl1 and fl5, between fl2 and each of fl3, fl4, and fl5, between fl3 and each of fl4 and fl5, and between fl4 and fl5. Four example histograms are shown in FIG. 8. The illustrated histograms are between fl1 and fl3, fl2 and fl3, fl4 and fl5, and fl4 and fl1. In the examples shown, the histogram mode may be the synchronization offset. The height of the histogram mode may be the score, or similarity value, between the two files and may indicate the strength of the synchronization offset. Each line in one of the histograms may represent a number of occurrences of an adjustment offset between landmarks that occur in both files. The tallest, and non-dashed line in each of the histograms of FIG. 8, may be the most commonly determined adjustment offset time and may be a candidate offset adjustment for synchronization of the two files. Note that in the top three histograms, there is a taller line and a number of smaller lines. The taller line may be the most commonly occurring time offset as determined during feature extraction. The shorter, dashed lines may be more rarely occurring time offsets from feature extraction. The last histogram of FIG. 8, for files fl4 and fl1, illustrates a number of short lines without a clear taller line. This may indicate false positives, such as noise patterns that matched in files fl4 and fl1. As described herein, the clustering at 320 may apply one or more decision rules to filter or ignore a false match such as the one indicated in FIG. 8. FIG. 9 illustrates the histograms of FIG. 8 with the tallest line circled indicating the candidate offset time. Note that the final histogram's circle is dashed representing a false match between the two files.

In one implementation, the histograms may be referred to as landmark cross-correlation signals and may be computed as follows. In one embodiment, clustering may include TDOA that may be used to synchronize each file pair. TDOA may be used within the framework of generalized cross-correlation in some embodiments. The estimated TDOA or time offset $\hat{t}_{ij}$ between file i and j may be computed as the time of the maximum of the cross-correlation signal $R_{Li,Lj}(t)$ as:

$$\hat{t}_{ij} = \arg\max_{t} R_{Li,Lj}(t). \quad (1)$$

The estimated TDOA may define the time shift needed to align the two signals appropriately. In one embodiment, the cross-correlation may be performed on a non-linearly transformed audio signal (e.g., the derived landmark signal L(t)) instead of on the time-domain audio signal x(t). Performing cross-correlation on L(t) may increase robustness against distortion and heavy background noise and reduce computational cost as compared to performing it on the time-domain audio signal x(t). The cross-correlation between $L_i$ and $L_j$ for files i and j may be referred to as a landmark cross-correlation signal and may be defined by:

$$R_{Li,Lj}(t) = \sum_{\tau=-\infty}^{\infty} L_i(\tau)^T L_j(t+\tau) \quad (2)$$

For a given time τ, the inner product of the two binary vectors may give the number of matching landmarks in both signals. When summed over all τ, the total number of matching landmarks may be computed for a time-shift t between $L_i$ and $L_j$.

Figure 10A:
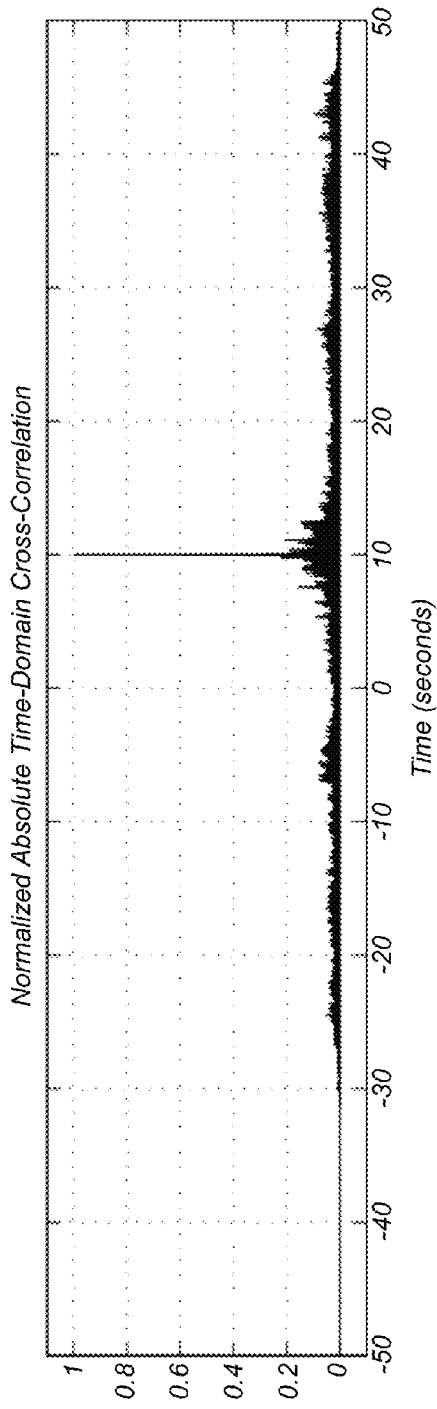
FIGS. 10A-B illustrate example time-domain and landmark cross-correlations, respectively, according to some embodiments.
Figure 10B:
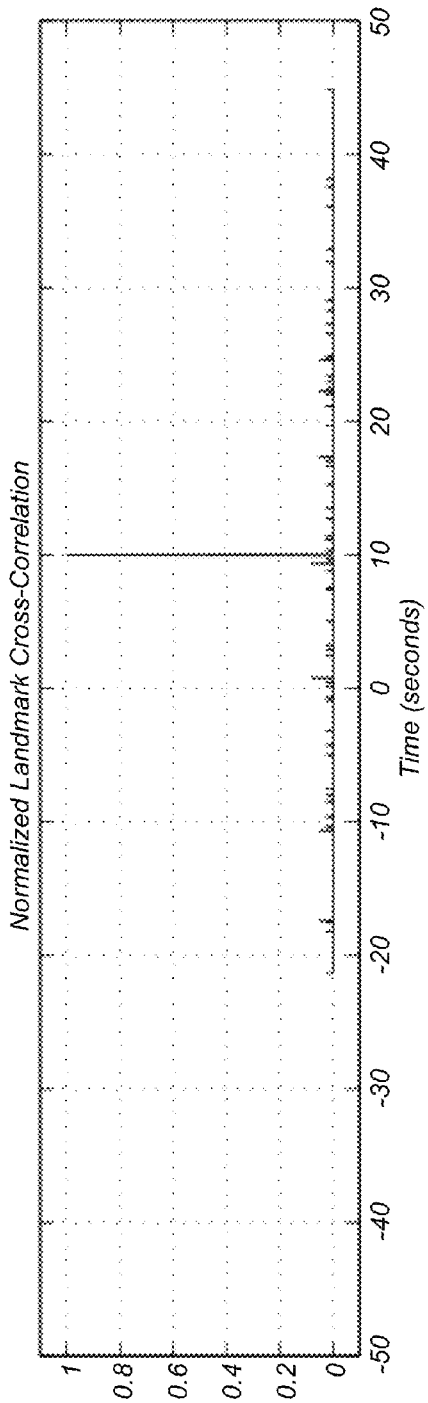

An example, cross-correlation between two different 60-second recordings of speech with an offset of 10 seconds is illustrated in FIGS. 10A-B. FIG. 10A shows a normalized absolute time-domain cross-correlation whereas FIG. 10B shows a normalized landmark cross-correlation according to some embodiments. As seen, both correlation signals correctly identify the TDOA of 10 seconds within the time quantization of the STFT hop size, but are very different in other respects. Depending on the desired accuracy, the time resolution of the STFT may or may not be sufficient. A final time-domain cross-correlation post-processing can be computed on a small overlapping region of the two files used to update the time resolution of the landmark correlation with minimal additional computational cost.

Figure 7:
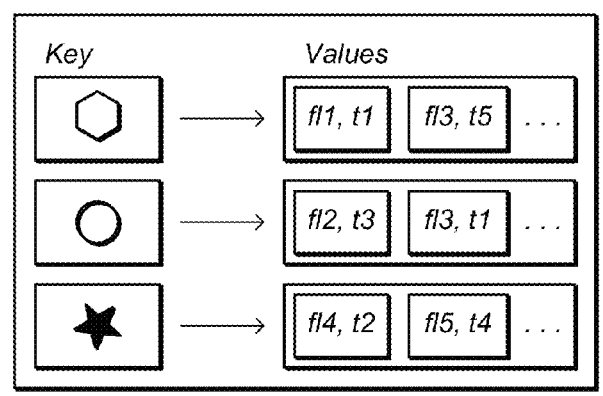
FIG. 7 illustrates an example map data structure of audio features according to some embodiments.

As one computationally efficient way of computing the above-described landmark signal cross-correlation, clustering may include generating a data structure, such as that of FIG. 7, which includes a mapping of the extracted audio features to files that include the respective one of the extracted audio features. The data structure may also include a time of occurrence of each of the audio features for each of the plurality of files. The one or more estimated offsets may be a difference between times of occurrence between two of the respective files that include the respective one extracted audio feature. To perform efficient cross-correlation, clustering may include generating a hash table or map (e.g., map data structure) of audio features (e.g., landmarks) or of one or more estimated time offsets (e.g., TDOA estimates). The hash table or map may be created by associating each non-zero landmark (map key) to a vector of tuples (map value). Each tuple may store the time of occurrence and file id (t,id) of its respective landmark. Once the map structure is created, the process may be iterated over all keys of the map and values may be found that have multiple unique file ids. The values may then be used to compute multiple time differences between the two files, which may then be summed into the appropriate position of $R_{Li,Lj}$. Such a computation may allow the time difference to be computed only for matching landmarks between files and may reduce the number of operations for cross-correlation to approximately O(N), where N is the number of unique matching landmarks between the two files (typically 10-100), plus the pre-computation cost of the hash map structure and linear time of feature extraction. Computational savings may be magnified when synchronizing and clustering large file collections with a small number of matching recordings per distinct event. When computed using the map structure, matching landmarks may be found for files of the same event and little to no matching landmarks may be found for files of different events. As such, the process may only compute cross-correlation signals between files of the same cluster and may ignore all other pair-wise combinations. For example, given a dataset of 100 recorded events, with two recordings per event (200 total files), this may be equivalent to computing only 100 linear correlations instead of approximately 5000 N log N correlations as would be the case if cross-correlation were performed on the time-domain audio signal.

In various embodiments, the set of histograms may be converted into one or more other data structures, such as a similarity matrix and an offset matrix. The mode of each histogram may be computed to give a candidate synchronization offset between each potential file pair. The candidate synchronization offsets may be stored in the offset matrix while the value may be stored in the similarity matrix. Continuing with the histograms of FIGS. 8-9 in relation to block 320 of the method of FIG. 3, in one embodiment, a maximum value of each of the histograms may be referred to as a similarity value. A larger maximum value may indicate a higher degree of similarity while a smaller maximum value may indicate a lower degree of similarity. A lower degree of similarity may be indicative of a false match between two files. The maximum value of the histogram for the file pair fl4 and fl1 may be below some threshold for determining that fl4 and fl1 should belong in the same cluster. Based on the histograms, a similarity matrix may be generated. A similarity matrix generated from the example histograms of FIGS. 8-9 can be seen in FIG. 11. In the example similarity matrix, a value is included between each file pair, which may represent a value based on the maximum value of each histogram. The example values shown in the similarity matrix of FIG. 11 may be normalized such that the maximum similarity value may be 1 and a minimum similarity value may be 0. FIG. 12 shows a similarity matrix that reflects rejecting the false match between files 1 and 4. The hatching represents the clustering of files 1, 2, and 3 and of files 4 and 5.

In various embodiments, clustering may include applying decision rules to process the similarity matrix. For example, determining matching files that may be clustered together may include selecting file pairs having a score in the similarity matrix above a threshold score. In the normalized example of FIGS. 11-12, file pairs having a score of 1 may be clustered together. Moreover, as shown in FIGS. 11-12, files fl1 and fl2 may be clustered together even if fl1 and fl2 did not have a similarity score above the threshold value because they may be linked by another file, fl3 in this example such that fl1, fl2, and fl3 may be clustered together. Similarly, files fl4 and fl5 may be clustered together in this example. In one embodiment, a final set of clusters and synchronization offset times may be computed from the similarity matrix by removing potential false matches using the decision rules.

In one embodiment, to identify distinct events within a larger collection, agglomerative clustering may be used based on the landmark cross-correlation signals for each file pair combination. To do so, each recording or audio file may be initialized as a separate cluster and then merged into successively larger clusters representing the different events of the larger collection. For instance, the two clusters of FIGS. 5 and 6 may be defined by a match between file 1 to 3, 2 to 3, and 4 to 5.

Figure 13:
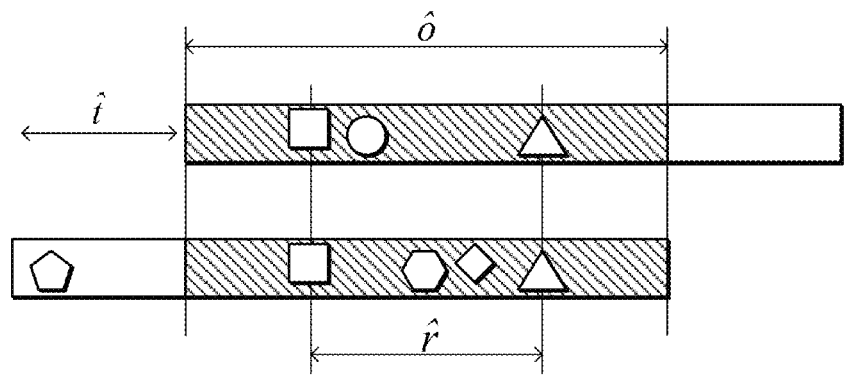
FIG. 13 illustrates an example decision rule according to some embodiments.
Figure 14A:
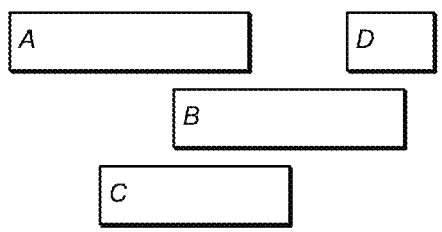
FIGS. 14A-D illustrate example synchronization refinement according to some embodiments.
Figure 14B:
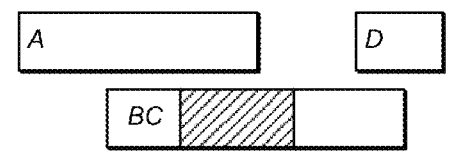
Figure 14C:
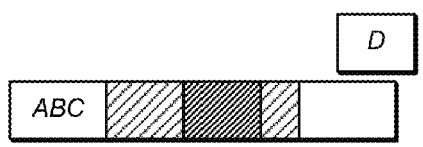
Figure 14D:
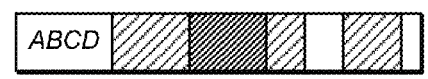

In some embodiments, two files may be merged together based on using the maximum of the correlation $\hat{R}_{Li,Lj}=\max R_{Li,Lj}(t)$ as a confidence score and comparing it to a minimum threshold $\theta$. If $\hat{R}_{Li,Lj} \geq \theta$, a match may be accepted; otherwise, in some embodiments, the match may be rejected. In other embodiments, instead of a simple threshold-based decision rule, specific landmarks from which the estimated TDOA is based may be monitored and various statistics may be computed for the landmarks to better inform the merge decision and remove false merges (false positives). Example decision rules in such embodiments may include: rejecting merges with a small percentage of total matching landmarks (in both files) in the overlap region ô, rejecting merges with a small overall time range r̂ defined by the matching landmarks, and rejecting merges with a small overlap region. Rejecting matches based on the percentage of total matching landmarks may help remove issues due to varying file lengths. FIG. 13 shows two different recordings of the same event, with the top file starting later and ending later. As shown, the percentage of matching landmarks within the top file is ⅔=66% while the percentage of matching landmarks within the bottom file is 50%. Rejecting matches within a small time range defined by the set of matching landmarks may help eliminate merges caused by densely packed landmarks in a small time region but nowhere else in the files. For example, such a dense concentration of landmarks could be due to noise and not true audio features. Further, rejecting matches with improbably small overlap regions may help further filter out erroneous matches. Additionally, the frequency of matching landmarks over time and/or adaptive thresholds on $R_{Li,Lj}$ can also be used.

In one embodiment, for each one of the one or more clusters, the content files belonging to that cluster may be time aligned. Thus, in the example in which fl1, fl2, and fl3 constitute one cluster and fl4 and fl5 constitute another cluster, the content files of each cluster may be synchronized. For example, files fl1, fl2, and fl3 may be synchronized within their respective cluster and files fl4 and fl5 may be synchronized within their respective cluster.

In one embodiment, the synchronization may be refined. Synchronization refinement may occur in a variety of cases. For example, synchronization refinement may occur when there are non-overlapping files within a cluster group (e.g., a match is found between files A and B as well as in files A and C, but not between file B and C). In such situations, a given file may not be connected to all other files within a cluster and therefore may not know the synchronization time offsets to fully synchronize all the files together. As another example, synchronization refinement may occur when there are inconsistent synchronization (e.g., TDOA) estimates that arise when synchronizing files within groups of three or more (e.g., matches between files A and B and between A and C are found implying a match between files B and C which is different than a directly estimated match between files B and C). Thus, an inconsistent estimate may occur when the pairwise TDOA estimates of a cluster of three or more does not satisfy all triangle equalities (e.g., $\hat{t}_{AC} \neq \hat{t}_{AB} + \hat{t}_{BC}$) as required by the one-dimensional time alignment. In any event, in one embodiment, synchronization refinement may allow the synchronization estimates to be refined using the previously clustered cluster sets.

In some embodiments, to perform synchronization refinement, a match between two files may be determined within a local similarity matrix. For example, finding the match may include finding the most confident TDOA estimate $\hat{t}_{ij}$ within the cluster in terms of $\hat{R}_{Li,Lj}$, similarity value, or some other similar confidence score. The audio landmarks (e.g., in histogram representation) may then be merged together. In one example, the landmark signals $L_i(t)$ and $L_j(t)$ may then be merged together by time shifting $Lj(t)$ by $\hat{t}_{ij}$ and then multiplying or adding the two signals together. The remaining histograms, offset matrix, and similarity matrix that collectively include the TDOA estimates and confidence scores may then be updated to reflect the merge. In one embodiment, the matching, merging, and updating may be repeated iteratively, until all files within a cluster are merged, for example. The merging and updating may be performed by re-computing the cross-correlation signals and TDOA estimates or, in some embodiments, by time shifting the TDOA estimates and assuming the confidence scores will remain the same throughout the process. The synchronization refinement may be computationally efficient and not require a master reference recording.

FIGS. 14A-D illustrate an example synchronization refinement of four example recordings with various degrees and configuration of overlap. From FIG. 14A to FIG. 14B, files B and C have been merged such that only three files remain of the four. From FIG. 14B to 14C, file A has been merged with previously-merged file BC to form file ABC. From FIG. 14C to 14D, the remaining file D is merged with file ABC to create a single merged file that may be time aligned to a single reference clock. In the illustrated example, the match and merge refinement took three iterations to consolidate from four files to one file.

In various embodiments, clustering and/or synchronizing may include receiving and applying a constraint. In one embodiment, a user interface for the method of FIG. 3 may include one or more sensitivity knobs to allow real-time changes to tune the synchronization. Constraints may also include input (e.g., algorithmic or from a user) to force accept or reject a match or matches. A rejected match may include detecting and rejecting media files that are from the same device. As other examples, a user may know that certain files should match and/or that certain files should not match and can provide input to force and/or reject those matches, respectively. In addition to incorporating such constraints, other input may be incorporated at various stages of the method of FIG. 3. As a result of the constraints, clustering accuracy and decision-making may be improved. In some embodiments, the constraint may include restricting to a subset of the plurality of content files. For instance, a subset of files may not automatically sync very well. By selecting the subset of files apart from others of the plurality of content files, a better automatic synchronization may occur. In various embodiments, feedback and interaction (e.g., by a user) may not require much additional computation power or time. As a result, real-time user interaction may be possible when adjusting clustering parameters, which may allow a user to adjust or tune parameters of the decision-making process in real-time and graphically view the updated clustering and synchronization results.

In some embodiments, features and/or histograms may be pre-computed. As a result, synchronization may appear instantaneous to a user of the method of FIG. 3.

As shown at 330, the files of each of the one or more clusters may be time aligned. For example, the files may be time aligned based on the synchronization offsets for each file pair in the cluster that overlaps in time. For example, consider a scenario in which a cluster includes three files, where files 1 and 2 and files 1 and 3 overlap but files 2 and 3 do not overlap. In one embodiment, the three files may be time aligned by based on the synchronization offsets between files 1 and 2 and between files 1 and 3. The file pair that includes files 2 and 3 may not have a synchronization offset, or at least not one above a threshold value, such that it may not be used in this example.

Using the clustering and synchronizing techniques described herein, more accurate, and more efficient clustering may be achieved. Moreover, the described techniques may allow non-overlapping content files to be clustered within a larger cluster, may allow inconsistent estimates between groups of three or more matching files to be resolved, and may allow for refinement of the clustering and synchronization. Moreover, the method of FIG. 3 may be computationally efficient such that large numbers of files and/or large file lengths may be used. By performing the synchronization estimates on a non-linearly transformed audio signal, the method of FIG. 3 may be efficient and scalable and may be usable in general TDOA estimation applications as well.

Figure 15:
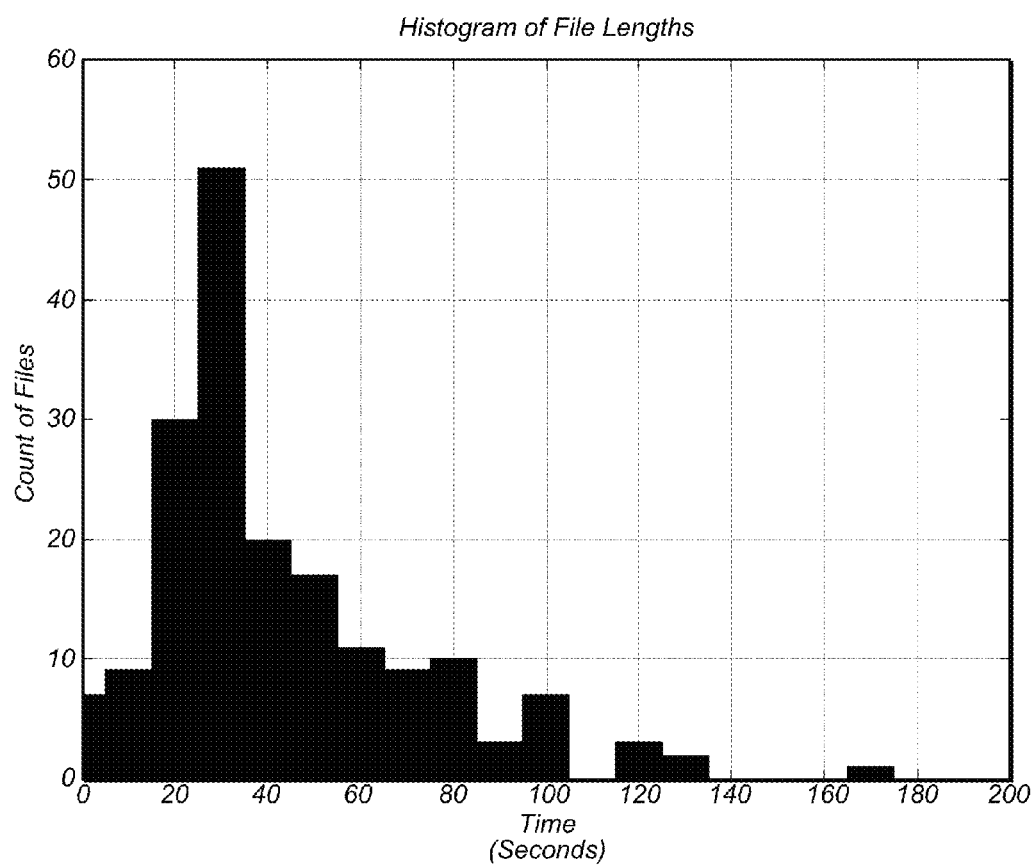
FIG. 15 illustrates a histogram of file lengths for an example application of the method of FIG. 3 according to some embodiments.

FIG. 15 illustrates a histogram of file lengths for an example application of the method of FIG. 3 using 180 files from an amateur movie. As shown in FIG. 15, the average file length was about 20-40 seconds. 98 of the 180 files included audio content but no video content and 82 of the files included video and audio content. The method of FIG. 3 generated 114 clusters: 54 clusters with a single file, 54 clusters with two files, and 6 clusters with three files.

Figure 16:
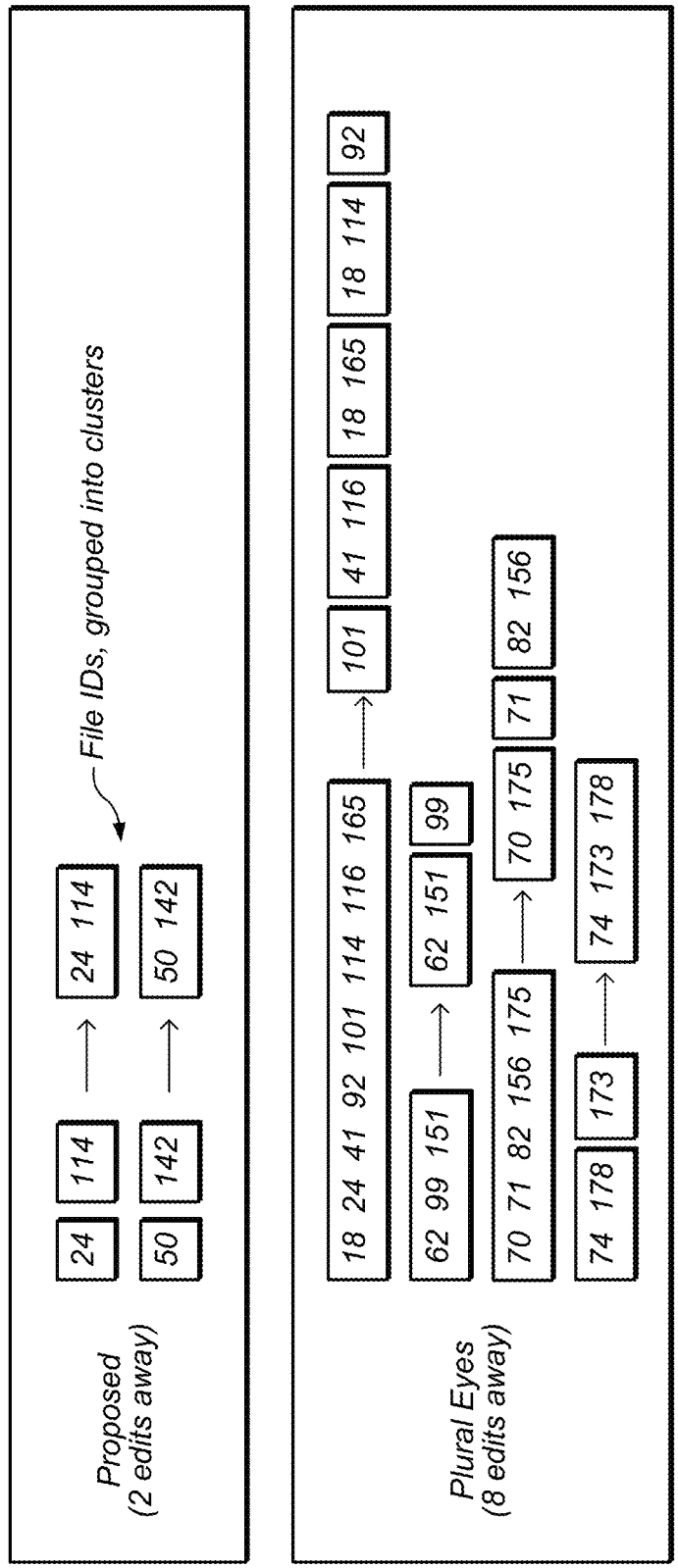
FIG. 16 illustrates a comparison of various methods for clustering and synchronization.

FIG. 16 illustrates a comparison of the method of FIG. 3 to the commercial video editing software, Plural Eyes (PE). Each block represents a cluster with the numbers in each block representing a file ID. Thus, the block in the upper right having the numbers 24 and 114 represents a cluster of files 24 and 114. To the left of each arrow in the figure shows incorrectly estimated clusters while to the right of each arrow shows correctly estimated clusters. Note that the method of FIG. 3 only incorrectly estimated two clusters whereas PE incorrectly estimated more clusters. Not only did the method of FIG. 3 perform substantially better than PE but it did so much more efficiently. Table 1 shows an efficiency comparison of two different versions of PE with the method of FIG. 3.

TABLE 1

|  | Method of FIG. 3 | PE 1.2.0 | PE 2.1.0 (hard) |
| --- | --- | --- | --- |
| Compute time | ~90 seconds | ~5 hours, 39 minutes | ~2 hours (10 hours) |
| With resampling | ~3-5 minutes | ~5 hours, 48 minutes | ~2 hours (10 hours) |
| Complexity | Features O (file length) matching O (number of files) | O (file length $\hat{}$ 2) O (number of files choose 2) | O (file length $\hat{}$ 2) O (number of files choose 2) |
| Code Base | Matlab and C++ | Optimized implementation code | Optimized multi-threaded implementation code |

The timing comparisons were performed on a MacBook Pro Laptop, OSX 10.6.8, 2.66 GHz Intel Core i7 processor. In the example illustrated by Table 1, the method of FIG. 3 may perform 25-120 times faster than PE. In the tested embodiment, the computational cost of the method of FIG. 3 may be about three minutes for feature extraction and about three to four seconds for clustering and synchronization. Feature extraction was implemented in Matlab code and may be parallelizable. In some embodiments, feature extraction may be implemented on a graphics processor unit (GPU) or dedicated hardware. Clustering and synchronization was implemented in C++ for the tested embodiment. Generating the map structure took about 1-2 seconds, generating histograms about 1-2 seconds, and generating the similarity matrix and making cluster decisions were nearly instantaneous.

Table 2 shows example results of precision, recall, and $F_1$-score that were used to evaluate the pair-wise merges of the clustering while manual listening tests were used to evaluate synchronization. The precision is the fraction of estimated merges that are correct when compared to ground truth. Recall is the fraction of the ground truth merges that are estimated and the $F_1$-score is the harmonic mean of the precision and the recall. Datasets of both speech and music recordings were used for the testing. Elaborating on the dataset, the speech dataset included 180 natural speech recordings taken from a film set with two separate recording devices. The recordings average 20-40 seconds in length and made up 114 clusters: 54 clusters of one file, 54 clusters of two files, and 6 clusters of three files. The music dataset consisted of 23 cell-phone recordings of three live music concerts of various styles, each averaging 3-6 minutes in length. In that set, there were 2 clusters of 8 files and 1 cluster of 7 files. Prior to computation, all recordings were time normalized to a sample rate of 8 kHz. The results are shown in Table 2, which also shows the total computation time for hand-tuned cluster decision parameters. The results show near perfect precision, recall, and $F_1$-score. Additionally, all of the files were verified to be correctly synchronized. In terms of computation time, all datasets were clustered and synchronized in a minute or two with high throughput compared to performing traditional FFT-based correlation on all pairwise file combinations. In addition, note the approximate linearity of the computation time of the disclosed techniques when processing both datasets independently versus the combined speech and music dataset.

TABLE 2

|  | Speech | Music | Speech + Music |
| --- | --- | --- | --- |
| Precision | 100% | 100% | 100% |
| Recall | 97.0% | 100% | 99.2% |
| F-score | 98.5% | 100% | 99.6% |
| Time (sec)/Throughput (s/s) | 47.0/164.6 | 41.1/146.5 | 90.1/152.7 |
| Time (sec)/Throughput (s/s) for FFT-based correlation | 1550/5.0 | 197/30.5+ | 3600/3.9 |

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the embodiments embrace all such modifications and changes and, accordingly, the above description to be regarded in an illustrative rather than a restrictive sense.

What is claimed is:

1. A method, comprising:
for each of a plurality of files that include audio content, extracting audio features corresponding to the audio content;
clustering the plurality of files into one or more clusters, said clustering including:
for each file pair of the plurality of files, generating a histogram based on one or more synchronization estimates, each synchronization estimate being a difference between offset estimates corresponding to a commonly occurring extracted audio feature in each of the respective files in the file pair, at least one histogram computed by calculating at least one cross-correlation on at least a portion of audio content, the portion of audio content being non-linearly transformed from at least a part of the audio content, the at least one cross-correlation comprising computing at least one inner product of two binary-valued vectors comprising the portion of audio content; and
determining the one or more clusters based on the generated histograms, said determining including determining which ones of the plurality of files belong in which of the one or more clusters; and
within each of the one or more clusters, time aligning the files of the cluster based on the extracted audio features from the files of the cluster.

2. The method of claim 1, wherein said clustering further includes:
for each file pair:
determining a synchronization offset based on the generated histogram; and
determining a similarity value for the respective files of the file pair based on a strength of the synchronization offset;
wherein said determining the one or more clusters is based on the similarity value of each file pair.

3. The method of claim 2, wherein said determining the one or more clusters includes clustering the respective files of file pairs having a similarity value above a threshold.

4. The method of claim 2, wherein the determined similarity values are stored in a similarity data structure.

5. The method of claim 2, further comprising refining said clustering, wherein refining includes, for one of the one of more clusters:
merging the files of the file pair having the highest similarity value in the one cluster, wherein said merging includes time aligning the files of the file pair based on the histogram for the file pair;
updating remaining synchronization estimates, synchronization offsets, and similarity values to reflect said merging; and repeating said refining for remaining unmerged files of the one cluster.

6. The method of claim 2, further comprising refining said clustering.

7. The method of claim 6, wherein said refining includes resolving inconsistent synchronization offsets of file pairs within a cluster.

8. The method of claim 2, wherein said time aligning is performed based on the synchronization offset for each file pair of the respective cluster that overlaps in time.

9. The method of claim 1, wherein at least one of the one or more clusters includes at least two files that are non-overlapping in time.

10. The method of claim 1, wherein said determining the one or more clusters is further based on a decision rule.

11. The method of claim 1, wherein said clustering further includes:
generating a data structure that includes a mapping of each one of the extracted audio features to respective files of the plurality of files that include the respective one of the extracted audio features, wherein the data structure further includes a time of occurrence of the respective one extracted audio feature in each of the respective files.

12. The method of claim 1, wherein said clustering further includes receiving and applying a constraint.

13. The method of claim 12, wherein the constraint includes a forced accept or reject clustering.

14. A non-transitory computer-readable storage medium storing program instructions, the program instructions being computer-executable to implement:
for each of a plurality of files that include audio content, extracting audio features corresponding to the audio content;
clustering the plurality of files into one or more clusters, said clustering including:
for each file pair of the plurality of files, generating a histogram based on one or more synchronization estimates, each synchronization estimate being a difference between offset estimates corresponding to a commonly occurring extracted audio feature in each of the respective files in the file pair, at least one histogram computed by calculating at least one cross-correlation on at least a portion of audio content, the portion of audio content being non-linearly transformed from at least a part of the audio content, the at least one cross-correlation comprising computing at least one inner product of two binary-valued vectors comprising the portion of audio content; and
determining the one or more clusters based on the generated histograms, said determining including determining which ones of the plurality of files belong in which of the one or more clusters; and
within each of the one or more clusters, time aligning the files of the cluster based on the extracted audio features from the files of the cluster.

15. The non-transitory computer-readable storage medium of claim 14, wherein said clustering further includes:
for each file pair:
determining a synchronization offset based on the generated histogram; and
determining a similarity value for the respective files of the file pair based on a strength of the synchronization offset;
wherein said determining the one or more clusters is based on the similarity value of each file pair with respect to a threshold.

16. The non-transitory computer-readable storage medium of claim 15, wherein the program instructions are further computer-executable to implement refining said clustering, wherein refining includes, for one of the one or more clusters:
merging the files of the file pair having the highest similarity value in the one cluster;
updating remaining synchronization estimates, synchronization offsets, and similarity values to reflect said merging; and
repeating said refining for remaining unmerged files of the one cluster.

17. The non-transitory computer-readable storage medium of claim 14, wherein the program instructions are further computer-executable to implement refining said clustering, wherein refining includes resolving inconsistent synchronization offsets of file pairs within a cluster.

18. The non-transitory computer-readable storage medium of claim 14, wherein at least one of the one or more clusters includes at least two files that are non-overlapping in time.

19. The non-transitory computer-readable storage medium of claim 14, wherein said determining the one or more clusters is further based on a decision rule.

20. A system, comprising:
at least one processor; and
a memory comprising program instructions, the program instructions being executable by the at least one processor to:
for each of a plurality of files that include audio content, extract audio features corresponding to the audio content;
cluster the plurality of files into one or more clusters, said clustering including:
for each file pair of the plurality of files, generating a histogram based on one or more synchronization estimates, each synchronization estimate being a difference between offset estimates corresponding to a commonly occurring extracted audio feature in each of the respective files in the file pair, at least one histogram computed by calculating at least one cross-correlation on at least a portion of audio content, the portion of audio content being non-linearly transformed from at least a part of the audio content, the at least one cross-correlation comprising computing at least one inner product of two binary-valued vectors comprising the portion of audio content; and
determining the one or more clusters based on the generated histograms, said determining including determining which ones of the plurality of files belong in which of the one or more clusters; and
within each of the one or more clusters, time align the files of the cluster based on the extracted audio features from the files of the cluster.

* * * * *